US008781290B2

(12) United States Patent
Lee

(10) Patent No.: US 8,781,290 B2
(45) Date of Patent: Jul. 15, 2014

(54) DISPLAY APPARATUS FOR RECORDING/REPRODUCING VIDEO SIGNAL AND/OR AUDIO SIGNAL AND METHOD THEREOF

(75) Inventor: Sang-hak Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 890 days.

(21) Appl. No.: 10/785,404

(22) Filed: Feb. 25, 2004

(65) Prior Publication Data
US 2004/0223726 A1 Nov. 11, 2004

(30) Foreign Application Priority Data

Mar. 17, 2003 (KR) .................. 10-2003-0016405
Apr. 24, 2003 (KR) .................. 10-2003-0026013

(51) Int. Cl.
*H04N 5/765* (2006.01)
*H04N 5/932* (2006.01)

(52) U.S. Cl.
USPC .......................................... 386/200; 386/204

(58) Field of Classification Search
USPC ............................................................ 386/46
See application file for complete search history.

(56) References Cited

U.S. PATENT DOCUMENTS

| 5,506,692 | A | * | 4/1996 | Murata | .......... | 358/442 |
| 5,852,474 | A | | 12/1998 | Nakagaki et al. | | |
| 5,933,839 | A | * | 8/1999 | Hasegawa et al. | ........ | 707/824 |
| 6,580,462 | B2 | * | 6/2003 | Inoue et al. | ........ | 348/460 |
| 6,904,406 | B2 | * | 6/2005 | Yamaji | .......... | 704/501 |
| 7,030,930 | B2 | * | 4/2006 | Kovacevic | .......... | 348/515 |
| 7,099,561 | B1 | * | 8/2006 | Lin et al. | .......... | 386/95 |
| 7,657,916 | B2 | * | 2/2010 | Rodriguez et al. | ........ | 725/115 |
| 2002/0071055 | A1 | | 6/2002 | Ooshima et al. | | |
| 2003/0106064 | A1 | * | 6/2003 | Plourde, Jr. | .......... | 725/91 |
| 2003/0192058 | A1 | * | 10/2003 | Miyatake et al. | ........ | 725/115 |

FOREIGN PATENT DOCUMENTS

| EP | 0464621 A2 | 1/1992 |
| EP | 0464621 A3 | 1/1992 |
| EP | WO02/104026 A1 | 12/2002 |
| JP | 07-336630 | 12/1995 |

(Continued)

OTHER PUBLICATIONS

European Search Report for corresponding European Patent Application No. EP04251517 dated Jan. 2, 2008 (3 pgs) (in English).

(Continued)

*Primary Examiner* — William C Vaughn, Jr.
*Assistant Examiner* — Oluwaseun A Adegeye
(74) *Attorney, Agent, or Firm* — Staas & Halsey LLP

(57) ABSTRACT

A display apparatus to store a broadcasting signal or a video signal and/or an audio signal in an external storage medium, and reproduce signals from the external storage medium includes a receiving processor, a controller, and an output unit. The receiving processor receives a video signal and/or an audio signal. The controller stores a video signal and/or an audio signal received using the receiving processor in the external storage medium in real time, if a user requires storage of the received video signal and the audio signal. The controller reproduces the stored video signal and/or audio signal from the external storage medium if the user requires reproduction of the video signal and/or the audio signal stored on the external storage medium. The output unit outputs the reproduced video signal and/or audio signal.

83 Claims, 12 Drawing Sheets

(56) References Cited

FOREIGN PATENT DOCUMENTS

| | | |
|---|---|---|
| JP | 9-65225 | 3/1997 |
| JP | 09198791 | 7/1997 |
| JP | 09-247629 | 9/1997 |
| JP | 10294924 | 11/1998 |
| JP | 2002-171449 | 6/2002 |
| JP | 2002-209174 | 7/2002 |
| JP | 2002-262220 | 9/2002 |
| KR | 10-2001-0038331 | 5/2001 |
| KR | 10-2002-0020443 | 3/2002 |
| KR | 10-2003-0025607 | 3/2003 |
| KR | 10-2003-0095138 | 12/2003 |

OTHER PUBLICATIONS

Japanese Office Action for Application No. 2004-071447; dated Oct. 17, 2006.

Japanese Office Action dated Oct. 27, 2009 issued in corresponding Japanese Patent Application 2004-71447.

Korean Notice of Allowance issued on Sep. 4, 2007 in corresponding Korean Application No. KR 10-2003-0026013.

* cited by examiner

DISPLAY APPARATUS FOR RECORDING/REPRODUCING VIDEO SIGNAL AND/OR AUDIO SIGNAL AND METHOD THEREOF

CROSS-REFERENCE TO RELATED APPLICATIONS

This application claims the benefit of Korean Patent Application No. 2003-16405, filed on Mar. 17, 2003 in the Korean Intellectual Property Office, and Korean Patent Application No. 2003-26013, filed on Apr. 24, 2003 in the Korean Intellectual Property Office, the disclosures of which are incorporated herein in their entirety by reference.

BACKGROUND OF THE INVENTION

1. Field of the Invention

The present invention relates to a display apparatus for and method of storing or reproducing a video signal and/or an audio signal, and more particularly, to a display apparatus for and method of storing in real time a received broadcasting signal including a video signal and/or an audio signal, or a video signal and/or an audio signal received from an external AV device in an external storage medium, and reproducing the received video signal and/or the received audio signal from the external storage medium.

2. Description of the Related Art

A display apparatus not only displays contents provided from a Personal Computer (PC) but also receives and displays a broadcasting signal, or a video signal and/or audio signal provided from an external Audio/Video (AV) device. For example, the display apparatus can be a multi-function monitor or a multi-function Liquid Crystal Display (LCD). The display apparatus generally includes a tuner and a decoder to perform the above operations. However, the display apparatus cannot store the received broadcasting signal or the video signal and/or the audio signal and reproduce the stored broadcasting signal or the video and/or audio signal itself. Accordingly, to perform the storage and reproduction of a signal, a user must operate a PC connected to the display apparatus. The user must individually operate appropriate programs loaded on the PC whenever trying to store or reproduce the signals. Also, the PC must include a board, such as a television integration board, in order to store a video signal and/or an audio signal received through the display apparatus in a storage medium included in the PC.

SUMMARY OF THE INVENTION

An aspect of the present invention provides a display apparatus for and method of storing a video signal and/or audio signal received from an external Audio/Video (AV) device or a received broadcasting signal in an external storage medium in real time, and reproducing a broadcasting signal, a video and/or audio signal from the external storage medium.

An aspect of the present invention also provides a display apparatus for and method of storing a received broadcasting signal or a video signal and/or audio signal received from an external AV device in an external storage medium in real time, and reproducing a broadcasting signal, a video signal and/or audio signal from the external storage medium, without operating a computer connected to the display apparatus.

An aspect of the present invention also provides a display apparatus for and method of displaying a broadcasting or a video signal and/or audio signal received from an external AV device in a format desired by a user, when storing or reproducing the broadcasting signal or the video signal and/or audio signal in real time.

An aspect of the present invention also provides a display apparatus for and method of storing a video signal and/or audio signal received from an external AV device or a broadcasting signal in an external storage medium and reproducing a video signal and/or audio signal or a broadcasting signal from the external storage medium, while displaying a received broadcasting signal or the video signal and/or audio signal received from the external AV device in real time.

An aspect of the present invention also provides a display apparatus for and method of recording a received broadcasting signal or a received video and/or audio signal in an external storage medium in real time and reproducing a broadcasting signal or a video signal and/or audio signal from the external storage medium, while managing the external storage medium on the basis of a file system thereof.

An aspect of the present invention also provides a display apparatus for and method of allowing a user to selectively store a broadcasting signal or a video signal and/or audio signal in an external storage medium or reproduce a broadcasting signal or a video signal and/or audio signal from the external storage medium, by informing the user of management information for the external storage medium.

Additional aspects and/or advantages of the invention will be set forth in part in the description which follows and, in part, will be obvious from the description, or may be learned by practice of the invention.

According to an aspect of the present invention, a display apparatus connected with an external storage medium includes a receiving processor that receives a video signal and/or an audio signal; a controller that stores the video signal and/or audio signal received using the receiving processor in the external storage medium in real time, if a user requests storing of the received video signal and/or audio signal, and reproduces a video signal or audio signal stored on the external storage medium, if the user requests reproduction of the video signal and/or audio signal stored on the external storage medium; and an output unit that outputs the reproduced video signal and/or audio signal.

According to another aspect of the present invention, a display apparatus connected with an external storage medium includes a receiving processor that receives a video signal and/or audio signal; a controller that forms a virtual file system for the external storage medium, stores the video signal and/or audio signal received through the receiving processor in the external storage medium in real time, if a user requests storing of the received video signal and/or audio signal, with reference to information generated on the basis of the virtual file system, and reproduces a video signal and/or an audio signal from the external storage medium, if the user requests that reproduction of the video signal and/or audio signal stored on the external storage medium, with reference to the information generated on the basis of the virtual file system; and an output unit that outputs the reproduced video signal and/or audio signal.

According to still another aspect of the present invention, a display apparatus connected with an external storage medium includes a receiving processor that receives a video signal and/or audio signal; a compression and decompression unit that, when set to a compression mode, compresses a video signal and/or an audio signal received from the receiving processor, if a user requests storage of the received video signal and/or audio signal, and, when set to a decompression mode, restores a video signal and/or audio signal received from an external storage medium, if the user requests reproducing of the video signal and/or audio signal stored on the external storage medium; an output unit that outputs the reproduced video signal and/or audio signal; and a controller that controls the compression and decompression unit in the compression mode and stores a video signal and/or audio signal compressed by the compression and decompression unit in the external storage medium in real time, if the user requests the storage, and outputs the video signal and/or audio signal from the external storage medium to the output unit through the compression and decompression unit, if the user requests the reproduction.

According to still yet another aspect of the present invention, a method of operating a display apparatus connected with an external storage medium includes receiving a video signal and/or an audio signal; storing the received video signal and/or audio signal in the external storage medium in real time, if a user requests storage of the received video signal and/or audio signal; and reading and reproducing a video signal and/or audio signal from the external storage medium, if the user requests reproduction of the of the stored video signal and/or audio signal stored on the external storage medium.

According to further aspect of the present invention, a method of operating a display apparatus connected with an external storage medium includes receiving a video signal and/or audio signal; compressing the received video signal and/or the audio signal if a user requests storage of the received video signal and/or the audio signal; storing the compressed video signal and/or audio signal in the external storage medium in real time; and restoring the stored video and/or audio signal stored on the external storage medium, when the user requests reproduction of the video signal and/or audio signal; and outputting the restored video signal and/or audio signal.

BRIEF DESCRIPTION OF THE DRAWINGS

The above and/or other features and/or advantages of the present invention will become more apparent and more readily appreciated by describing in detail exemplary embodiments thereof with reference to the accompanying drawings in which.

DETAILED DESCRIPTION OF THE EMBODIMENTS

Figure 1:
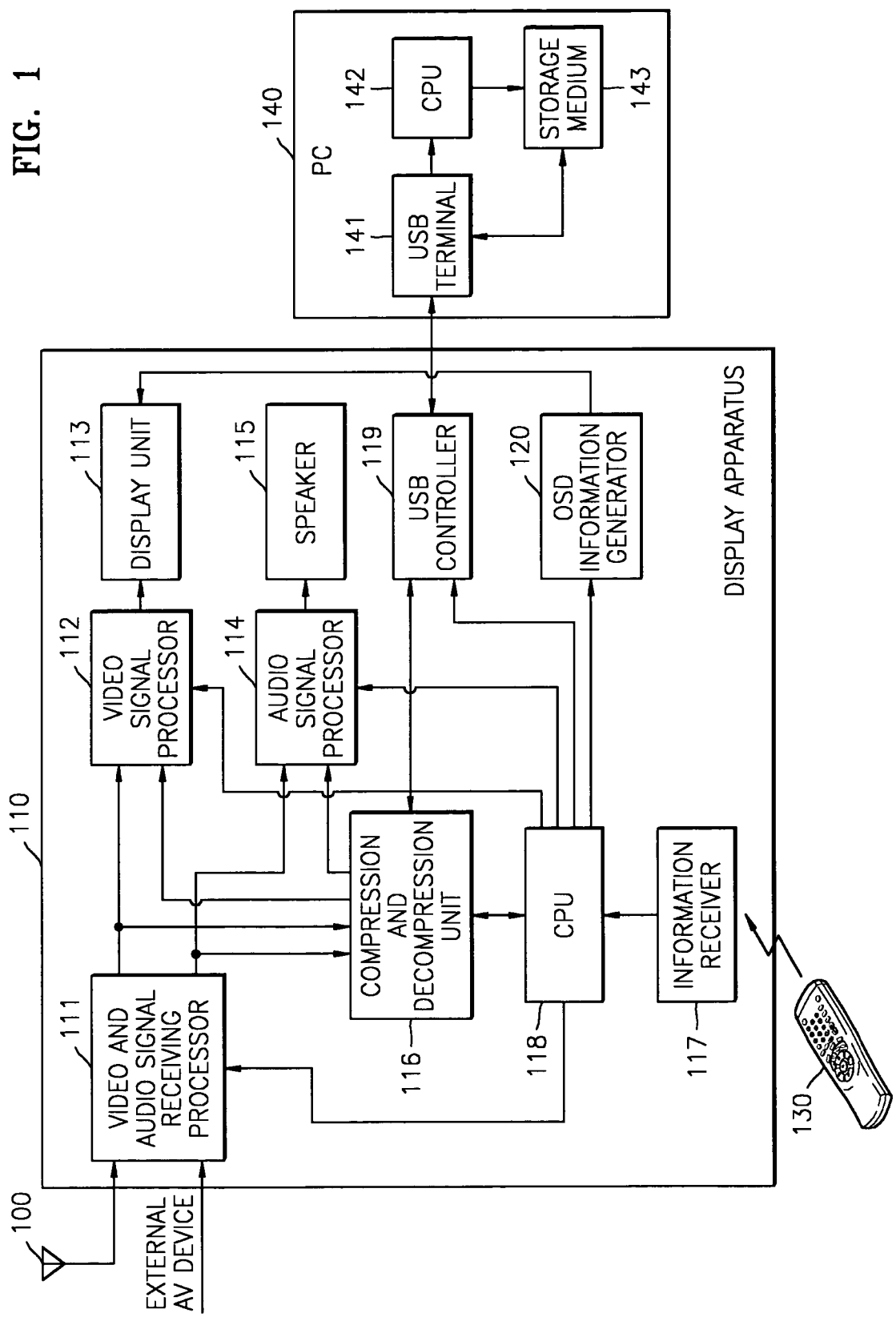
FIG. 1 is a block diagram of a display apparatus according to an embodiment of the present invention and peripheral devices thereof.

Hereinafter, embodiments of the present invention will be described in detail with reference to the accompanying drawings, wherein like reference numerals refer to the like elements throughout. The embodiments are described below to explain the present invention by referring to the figures.

FIG. 1 is a block diagram of a display apparatus according to an embodiment of the present invention and peripheral devices thereof. The system shown in FIG. 1 comprises an antenna 100, a display apparatus 110 according to an embodiment of the present invention, a remote controller 130, and a Personal Computer (PC) 140. According to an aspect of the invention, the antenna 100 receives broadcasting signals including video and/or audio signals. However, it is understood that other types of signals may be received. Additionally, it is understood that other types of electronic devices can be used instead of or in addition to the PC 140, such as personal digital assistants, digital music/file players such as MP3 players and digital video recorders, and other such devices which can be connected to a display and store data.

The shown embodiment of the display apparatus 110 comprises a video and audio signal receiving processor 111, a video signal processor 112, a display unit 113, an audio signal processor 114, a speaker 115, and a compression and decompression unit 116, an information receiver 117, a central processing unit (CPU) 118, a Universal Serial Bus (USB) controller 119, and an On-Screen Display (OSD) information generator 120. The video and audio signal receiving processor 111 is controlled by the CPU 118 and receives the broadcasting signal through the antenna 100 and receives a video signal and/or audio signal from an external Audio/Video (AV) device. The received video signal from the external Audio/Video (AV) device and through the antenna 100 is output to the video signal processor 112 and the compression and decompression unit 116, respectively. The received audio signal from the external Audio/Video (AV) device or through the antenna 100 is output to the audio signal processor 114 and the compression and decompression unit 116, respectively. While described as being received through both the antenna 100 and the external device, it is understood that the display apparatus 110 can receive the signal from other sources, and need not be able to receive the signal from both the antenna 100 and the external device. It is also understood that the CPU 118 is not restricted to a particular type of microprocessor or processor.

The video signal processor 112 is controlled by the CPU 118. The video signal processor 112 and processes at least one among the video signal transmitted from the video and audio signal receiving processor 111 and the video signal transmitted from the compression and decompression unit 116 to be displayed on the display unit 113. As shown, the video signal processor 112 processes the video signal transmitted from the video and audio signal receiving processor 111 and the video signal transmitted from the compression and decompression unit 116 so that the video signals are displayed together in a display format from among various display formats such as a Picture-In-Picture (PIP) format, a Picture-By-Picture (PBP) format, etc. However, the video signal processor 112 need not do so in all aspects of the invention.

The display format is determined by the CPU 118. The CPU 118 determines the display format according to a user's request (or user's command) received through the information receiver 117. The CPU 118 controls the video signal processor 112 so that the video signal can be displayed according to the determined display format. Also, the CPU 118 determines whether the video signal being stored on a storage medium 143 of the PC 140 should be displayed on the display unit 113, according to the user's request received through the information receiver 117, to control the video signal processor 112. If the user does not want to display the stored video signal, the CPU 118 controls the video signal processor 112 so that the stored video signal is not displayed on the display 113. However, if the user wants to display the stored video signal, the CPU 118 controls the video signal processor 112 so that the stored video signal is displayed on the display unit 113.

While described as being controlled by a user input, it is understood that the display format and/or the display of the stored video signal can be otherwise input, such as in broadcast data received at the display apparatus 110 or in default display formats and/or display times used by the CPU 118. For instance, a condition for displaying the storing video signal on the display 113 can be set by default according to an aspect of the invention. In this aspect, the CPU 118 controls the video signal processor 112 so that the stored video signal is displayed in real time on the display 113 unless the user does not input a separate command. However, it is understood that the default could also be to not display the stored video signal in real time, or to display the stored video signal with a predetermined delay after the video signal is stored on the external storage medium 143.

In the shown embodiment, when the stored video signal and/or audio signal stored on the storage medium 143 is reproduced, the CPU 118 controls the video signal processor 112 and the audio signal processor 114 so that the video signal and/or audio signal received through the video and audio signal receiving processor 111 is output through the display unit 113 and/or the speaker 115 in real time.

The display unit 113 is a device, such as a liquid crystal display (LCD), an organic light-emitting diode (OLED), a plasma display device (PDP), a cathode ray tube (CRT) or any other device through which visual information is conveyed.

The audio signal processor 114 processes a received audio signal so that the audio signal transmitted from the video and audio signal receiver 111 or the compression and decompression unit 116 can be output through the speaker 115. Also, the audio signal processor 114 can process the audio signal so that management information for the storage medium 143 of the PC 140 is output through the speaker 115, wherein the management information is provided from the CPU 118. The speaker 115 outputs the audio signal received from the audio signal processor 114. However, it is understood that if no audio signal is to be output by the display apparatus 110 or if an external speaker is to be used, the audio signal processor 114 and/or the speaker 115 need not be included in the display apparatus 110.

The video signal processor 112, the display unit 113, the audio signal processor 114, and the speaker 115 are output units for outputting video signals and/or audio signals in the shown embodiment.

The compression and decompression unit 116 is controlled by the CPU 118. The CPU 118 and sets the compression and decompression unit 116 to a compression mode and a decompression mode according to the desired function. If the compression and decompression unit 116 is set to the compression mode, the compression and decompression unit 116 compresses the video signal and/or audio signal output from the video and audio signal receiving processor 111. The compression can be performed according to the MPEG-2 or MPEG-4 standards, by way of example, but can be any suitable compression standard. The compressed video signal and/or audio signal is output to a Universal Serial Bus (USB) controller 119. While described in terms of USB, it is understood that other protocols, such as IEEE 1394 (FIREWIRE) or USB 2.0 could be used, and that wireless protocols could be used such as 802.11 based protocols.

If the compression and decompression unit 116 is set to the decompression mode, the compression and decompression unit 116 restores a video signal and/or audio signal received through the USB controller 119 into an original form of the signal. The compression and decompression unit 116 and outputs the restored video signal and/or audio signal to the video signal processor 112. It is understood that, where compression is not used, the compression and decompression unit 116 need not be used. Additionally, if the video signal and/or audio signal is received in a compressed mode, that only a decompression unit 116 need be used.

The information receiver 117 receives a user's request transmitted from the remote controller 130, or receives a user's request generated by operating a button (not shown) or a key (not shown) on a front panel of the display apparatus 110. The information receiver 117 transmits the received user request to the CPU 118. The CPU 118 is a controller for controlling operations of the video and audio signal receiving processor 111, the video signal processor 112, the compression and decompression unit 116, the USB controller 119, and the OSD information generator 120, according to the user's request received through the information receiver 117.

If a user requests storage of a received video signal and/or audio signal, the CPU 118 controls functions of the display apparatus 110, including the compression and decompression unit 116 and the USB controller 119, so that the received video signal and/or audio signal is stored on the storage medium 143 of the PC 140 in real time.

If the user requests reproduction of a video signal and/or audio signal stored on the storage medium 143 of the PC 140, the CPU 118 controls functions of the display apparatus 110 including the compression and decompression unit 116 and the USB controller 119, so that the video signal and/or audio signal is reproduced.

Figure 2:
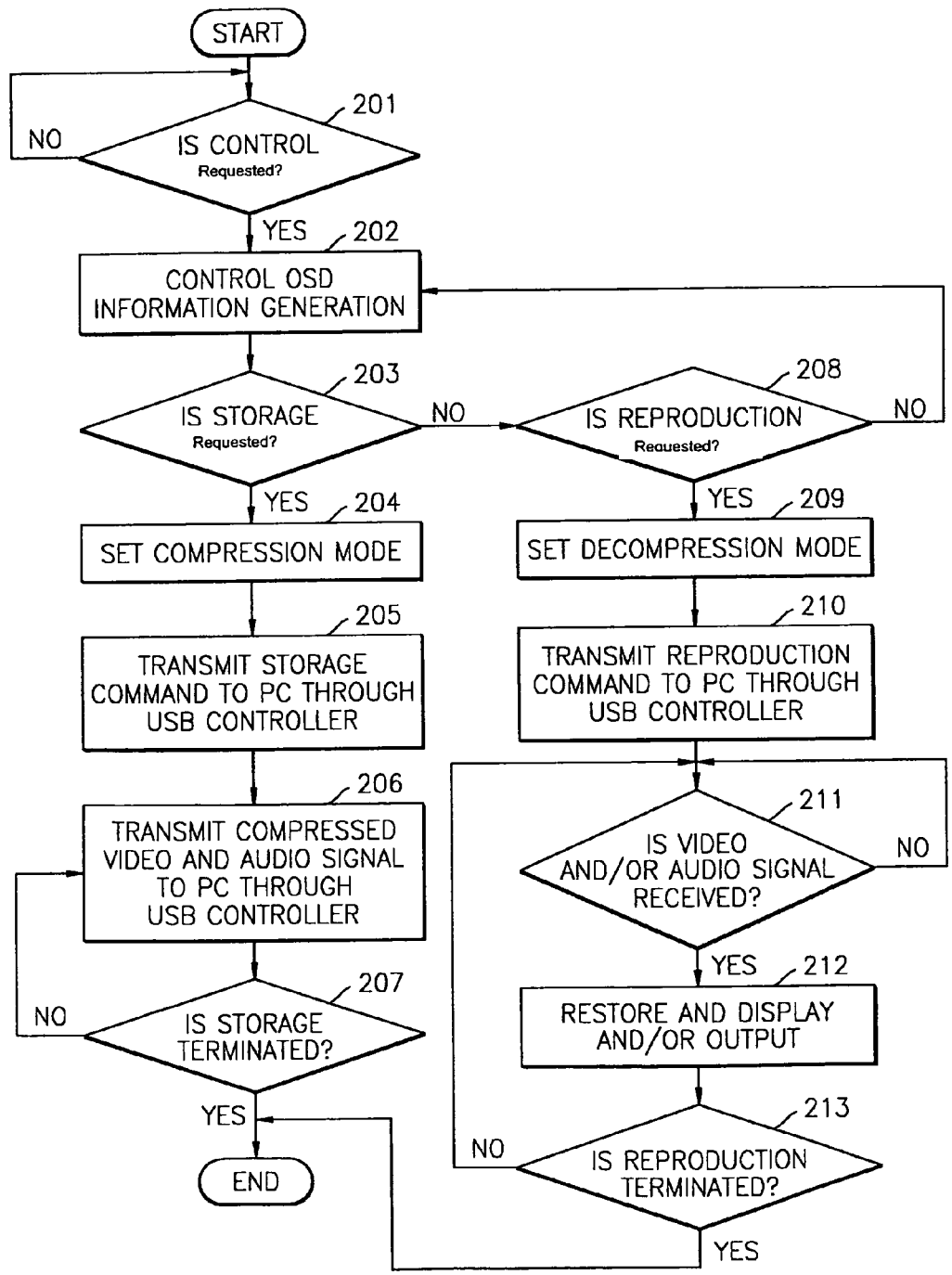
FIG. 2 is a flow chart of a method for operating the display apparatus according to an embodiment of the present invention.

FIG. 2 is a flow chart of a method for operating the display apparatus 110, according to an embodiment of the present invention. Referring to FIG. 2, the operations of the CPU 118 will be described in more detail below. While not requested in all aspects, it is understood that the method may be performed by computer software used by the CPU 118 to implement the method of FIG. 2.

If the CPU 118 receives a control request for the storage medium 143 of the PC 140 from the information receiver 117 in operation 201, the CPU 118 controls the OSD information generator 120 in operation 202. The OSD information generator 120 generates OSD information including information to be requested or inputted by a user, to perform the control for the storage medium 143. The generated OSD information is output to the display unit 113 and displayed on the display 113.

If a user requests a function using a remote controller 130 with reference to the OSD information, the information receiver 117 receives and transmits a request signal to the CPU 118. If the CPU 118 determines that the user requests storage of the received video signal and/or audio signal in operation 203, the CPU 118 controls the compression and decompression unit 116 in the compression mode in operation 204. While not requested in all aspects, the CPU 118 may determine whether the received video signal and/or audio signal are transmitted to the display unit 113 and/or the speaker 115, by a user request using the remote controller 130.

The CPU 118 transmits a storage command to the PC 140 through the USB controller 119 in operation 205. While not requested in all aspects, to store a received broadcasting signal or a video signal and/or audio signal received from an external AV device in the storage medium 143 included in the PC 140, predetermined information can be transmitted and received between the PC 140 and the display apparatus 110. The predetermined information is information used for setting an environment for transmitting and receiving a signal between the PC 140 and the display apparatus 110.

In operation 206, the CPU 118 sends a video and/or audio signal compressed by the compression and decompression unit 116 to the PC 140 using the USB controller 119 and the terminal 141. The compressed video and/or audio signal is one among the broadcasting signal or the video signal and/or audio signal transmitted from the external AV device and a signal selected by the user. If the user requests storage termination in operation 207, the CPU 118 terminates the storage operation. However, if the storage termination is not requested in operation 207, the CPU 118 returns to operation 206 and continuously performs the storage operation until a signal requesting the storage termination is received.

Meanwhile, if storage is not requested in operation 203 and if the user requests reproduction of a stored video signal and/or audio signal stored on the storage medium 143 in operation 208, the CPU 118 controls the compression and decompression unit 116 to be set in the decompression mode in operation 209. The CPU 118 transmits a reproduction command to the PC 140 through the USB controller 119 in operation 210.

If a video and/or audio signal is received from the PC 140 through the USB controller 119 in operation 211, the CPU 118 controls the compression and decompression unit 116 and the video signal processor 112 so that the received video signal and/or audio signal is restored by the compression and decompression unit 116, and is displayed on the display 113 in operation 212.

If the user requests reproduction termination in operation 213, the CPU 118 terminates the reproduction operation. However, if the user does not request the reproduction termination, the CPU 118 returns to operation 211 and continuously performs the reproduction operation until a signal requesting the reproduction termination is received.

The USB controller 119 is controlled by the CPU 118 to transmit the compressed video and/or audio signal transmitted from the compression and decompression unit 116 to the PC 140, and to transmit the compressed video and/or audio signal transmitted from the PC 140 to the compression and decompression unit 116, according to a Universal Serial Bus (USB) standard. Also, the USB controller 119 transmits the storage request command or reproduction request command transmitted from the CPU 118, to the PC 140. However, it is understood that protocols other than USB can be used.

The remote controller 130 is constructed so that a user can input his/her command with reference to the OSD information displayed on the display unit 113. However, it is understood that the controller 130 need not be used in all aspects, and that other input devices can be used. It is also understood that the OSD information can be otherwise displayed, such as on a display on the remote control 130 or a personal digital assistant.

The PC 140 comprises a USB terminal 141, a CPU 142, and the storage medium 143. The storage medium 143 is an external storage medium of the display apparatus 110. Accordingly, if a storage request command or a reproduction request command is received from the display apparatus 110 through the USB terminal 141, the storage request command or reproduction request command is transmitted to the CPU 142. Also, the signal transmitted and received between the display apparatus 110 and the PC 140, for setting the environment for the storage or reproduction, is transmitted to the CPU 142 through the USB terminal 141.

If the storage command is received and a compressed video and/or audio signal is received through the USB terminal 141, the received video and/or audio signal is controlled by the CPU 142 and stored on the storage medium 143. However, if the reproduction command is received, the CPU 142 controls the storage medium 143 so that the stored video and/or audio signal stored on the storage medium 143 is transmitted to the display apparatus 110 through the USB terminal 141.

The PC 140 may be replaced by a digital camcorder, a personal digital assistant, digital player (such as an MP3 player), a memory card, or a video card, each including a USB terminal and a CPU. Also, the storage medium 143 may be a hard disk (HDD), or may be an optical medium, such as recordable compact discs (CDs), digital versatile discs (DVDs), Blu-ray discs, or advanced optical discs (AOD's).

In the embodiment described above, the display apparatus 110 is controlled, and the environment for transmitting and receiving a signal between the display apparatus 110 and a PC 140 is set. A video signal and/or an audio signal received through the video signal and/or audio signal receiving processor 111 is compressed and stored in real time on the storage medium 143 included in the PC 140, or a video signal and/or an audio signal stored on the storage medium 143 is reproduced and restored. In this embodiment, the user can input the storage request or a reproduction request, with reference to OSB information displayed on a display unit 113 or audio guide information output through the speaker 115.

Figure 3:
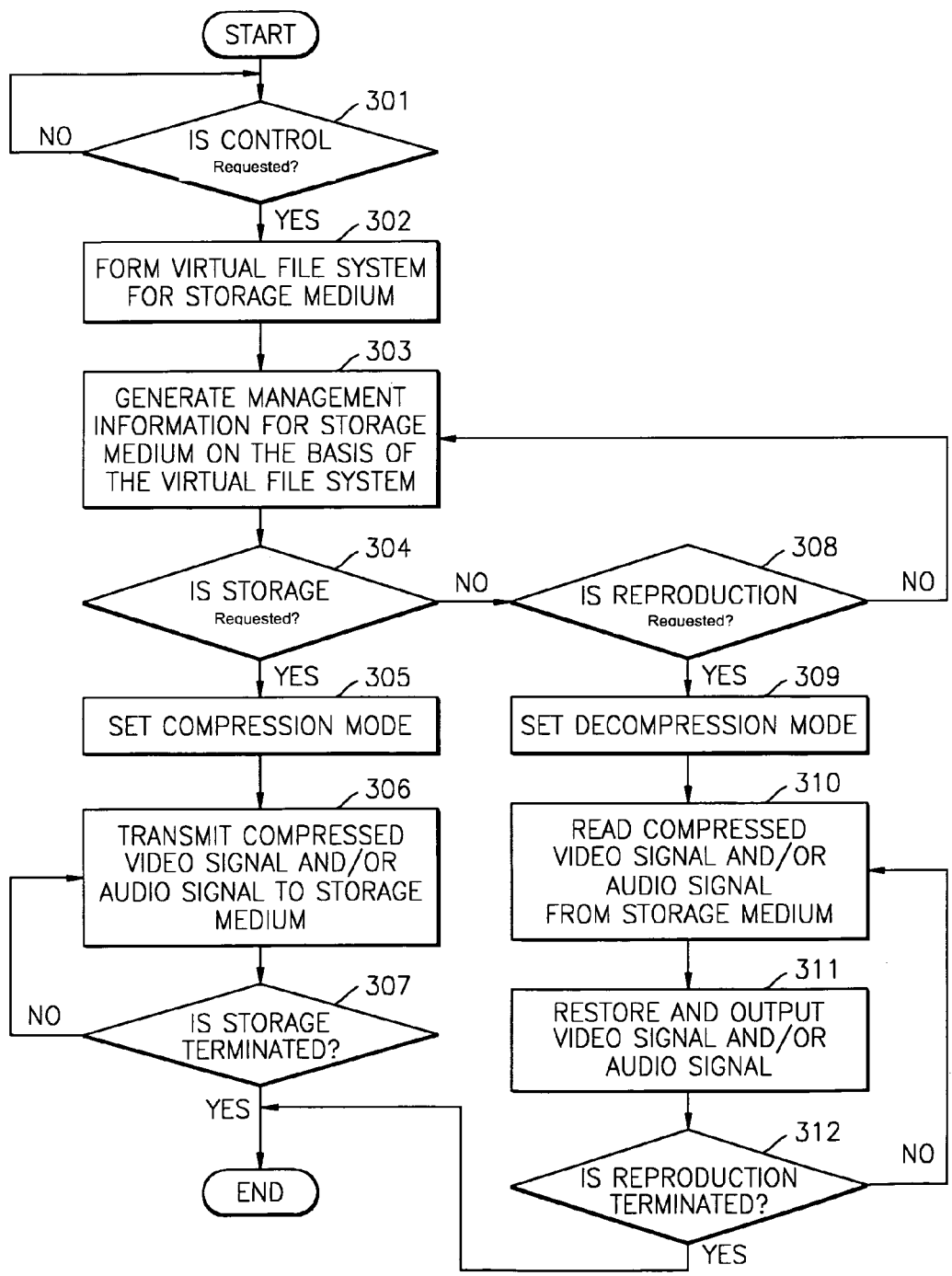
FIG. 3 is a flow chart of a method for operating the display apparatus according to another embodiment of the present invention.

According to an aspect of the present invention shown in FIG. 3, the CPU 118 of the display apparatus 110 performs the storage or reproduction while directly controlling the storage medium 143, without control of CPU 142 included in the PC 140. If a user input requests control of the storage medium 143 in operation 301, the CPU 118 forms a virtual file system (i.e., a system for managing the stored data) for the storage medium 143 in operation 302. The CPU 118 can download a file system managed by the CPU 142 of the PC 140 or stored on the storage medium 143 using the USB controller 119, and forms the virtual file system. However, the virtual file system can also be stored locally in the display apparatus 110. According to an aspect of the invention, the virtual file system is an abstraction of a physical file system and allows a consistent interface to multiple file systems, both local and remote, and allows a single directory to reference a number of diverse file system types as if the files were in a consistent file system type. However, it is understood that other file systems could be used so long as the file system, whether virtual or otherwise, allows the CPU 118 access to the stored audio and/or video data in the storage medium 143.

Then, the CPU 118 generates management information for the storage medium 143 using the virtual file system (operation 303). The management information includes time information corresponding to a storage capacity of the storage medium 143, and list information of the video signal and/or audio signal stored on the storage medium 143. The management information can be output as OSD information or as an audio signal.

In order to allow a user to control the storage medium 143, information that can be requested or input by the user as in operation 202 of FIG. 2 can also be output as OSD information or as an audio signal. Also, if a plurality of video signals and audio signals are stored on the storage medium 143, the list information includes index information for the plurality of video signals and audio signals. Accordingly, the user can select and reproduce a desired video signal and audio signal based on the list information. It is further understood that the information may include search results related to input received from a user.

If the user requests storage of the received video signal and/or audio signal in operation 304, the CPU 118 controls the compression and decompression unit 116 in a compression mode in operation 305. The CPU 118 controls the USB controller 119 so that the video signal and/or audio signal compressed by the compression and decompression unit 116 is transmitted to the PC 140 through the USB controller 119 (operation 306). Accordingly, the storage medium 143 of the PC 140 stores the video signal and/or audio signal received through the USB terminal 141, without control of the CPU 142.

The compressed video signal and/or audio signal is one among a broadcasting signal or a video signal and/or an audio signal transmitted from an external AV device and a signal selected by a user. Also, when the video signal and/or audio signal is stored, the stored video signal and/or audio signal can be output to the display 113 and/or the speaker 115.

If the user requests storage termination in operation 307, the CPU 118 terminates the storage operation. However, if the user does not request the storage termination in operation 307, the CPU 118 returns to operation 306, and continuously stores the compressed video signal and/or audio signal until a signal requesting the storage termination is received.

Meanwhile, if storage is not requested in operation 304 and if the user requires reproduction of a video signal and/or audio signal stored on the storage medium 143 in operation 308, the CPU 118 controls the compression and decompression unit 116 in a decompression mode in operation 309. The CPU 118 reads a video and/or audio signal from the storage medium 143 of the PC 140 through the USB controller 119 in operation 310. The CPU 118 restores the read video and/or the audio signal in the compression and decompression unit 116, and controls the video signal processor 112 to display the restored video signal and/or audio signal on the display unit 113. The reproduced video signal can be controlled so that it is displayed together, such as in a PIP or PBP format, with the video signal received through the video and audio signal receiving processor 111.

If the user requests reproduction termination in operation 312, the CPU 118 terminates the reproduction operation. However, if the user does not request the reproduction termination, the CPU 118 returns to operation 310 and continuously performs the reproduction operation until a signal requesting the reproduction termination is received.

Figure 4:
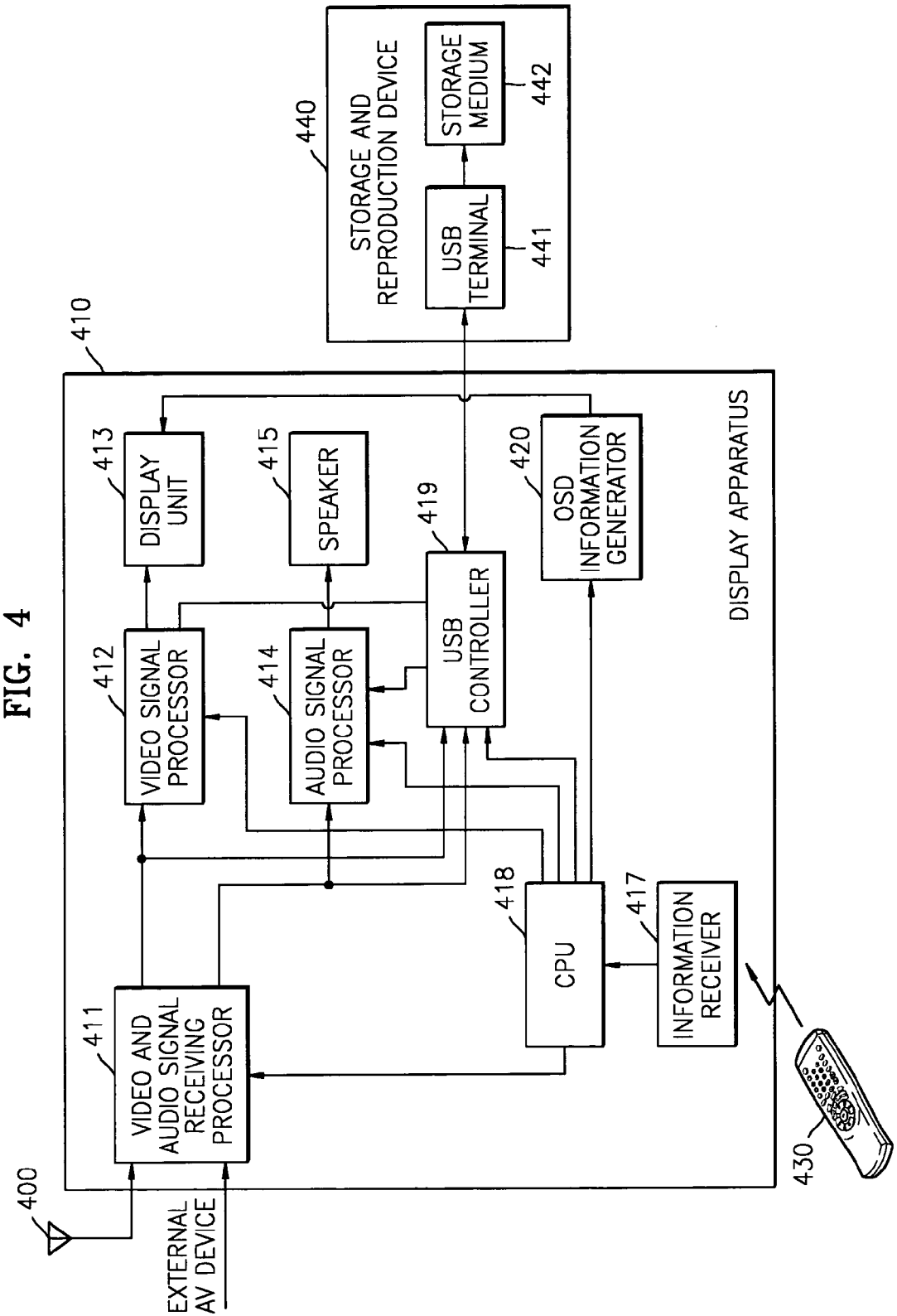
FIG. 4 is a block diagram of a display apparatus according to another embodiment of the present invention and peripheral devices thereof.

FIG. 4 is a block diagram of a display apparatus according to another embodiment of the present invention and peripheral devices thereof. The system shown in FIG. 4 comprises an antenna 400, a display apparatus 410, a remote controller 430, and a storage and reproduction unit 440. The antenna 400 and the remote controller 430 are generally the same as the antenna 100 and the remote controller 130 shown in FIG. 1. The display apparatus 410 is constructed so that a video and/or an audio signal is stored or reproduced without compression or restoration.

The display apparatus 410 comprises a video and audio signal receiving processor 411, a video signal processor 412, a display unit 413, an audio signal processor 414, a speaker 415, an information receiver 417, a CUP 418, an USB controller 419, and an OSD information generator 420. The video and audio signal receiving processor 411 receives a video and/or audio signal from the antenna 400 or an external AV device (not shown). The video and audio signal receiving processor 411 is controlled by the CPU 416 and outputs the received video signal to the video signal processor 412 and/or the USB controller 419. The video and audio signal receiving processor 411 is controlled by the CPU 418 and outputs the received audio signal to the audio signal processor 414 and/or the USB controller 419.

The video signal processor 412, the display unit 413, the audio signal processor 414, the speaker 415, the information receiver 417, and the OSD information generator 420 operate in the same or similar manner as the video signal processor 112, the display unit 113, the audio signal processor 114, the speaker 115, the information receiver 117, and the OSD information generator 120, respectively, shown in FIG. 1.

When the received video signal and/or an audio signal is stored, the USB controller 419 is controlled by the CPU 418, and transmits the video and/or the audio signal output from the video and audio signal receiving processor 411 to the storage and reproduction unit 440. Also, when a video signal and/or audio signal stored on the storage medium 442 is reproduced, the USB controller 419 outputs the video signal transmitted from the storage and reproduction unit 440 to the video signal processor 412, and outputs the audio signal transmitted from the storage and reproduction unit 440 to the audio signal processor 414. As such, no further compression or decompression is performed to the received signal unless the received signal is received compressed and no further decompression is required except using the processors 412, 414.

Figure 5:
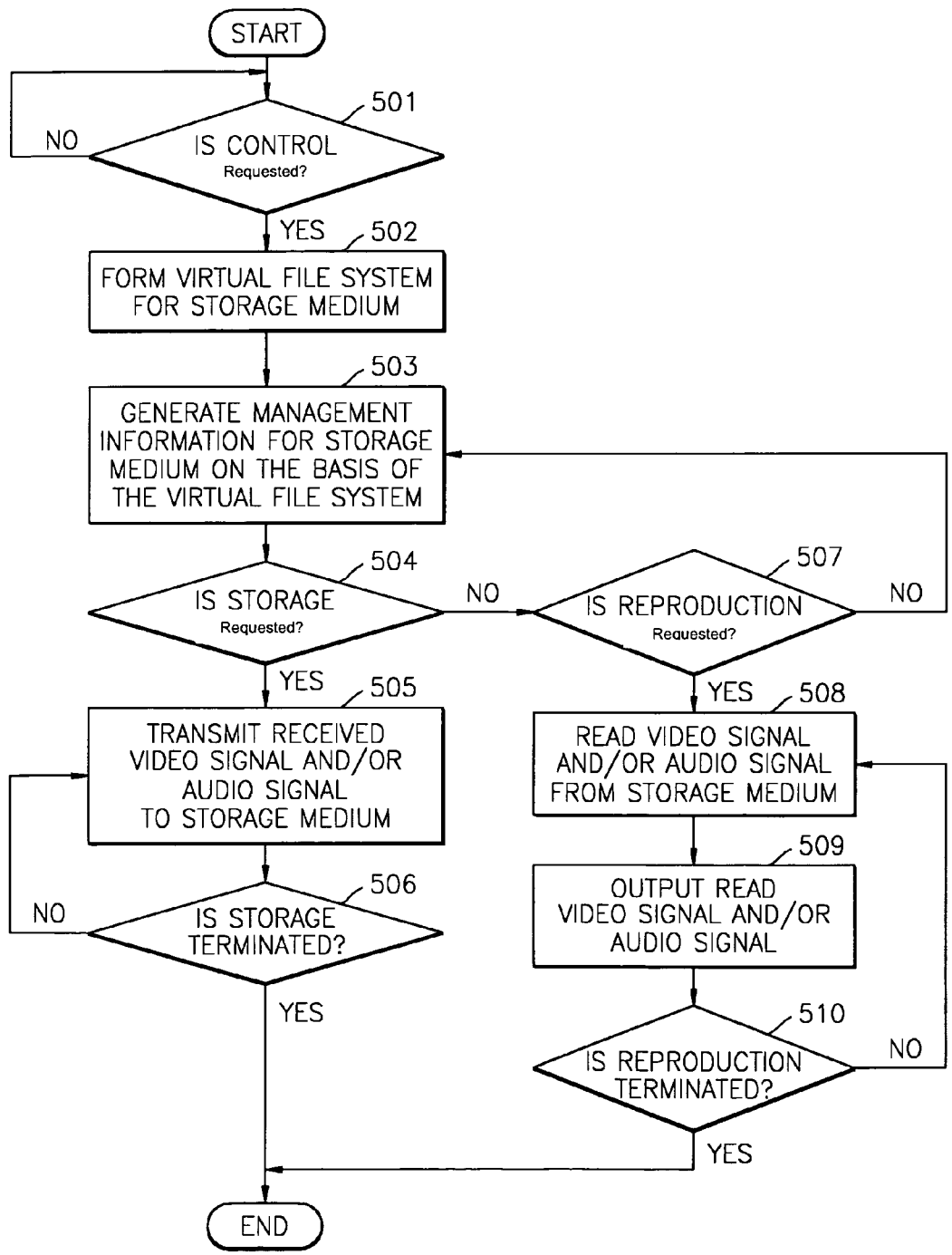
FIG. 5 is a flow chart of a method for operating the display apparatus according to still another embodiment of the present invention.
Figure 6:
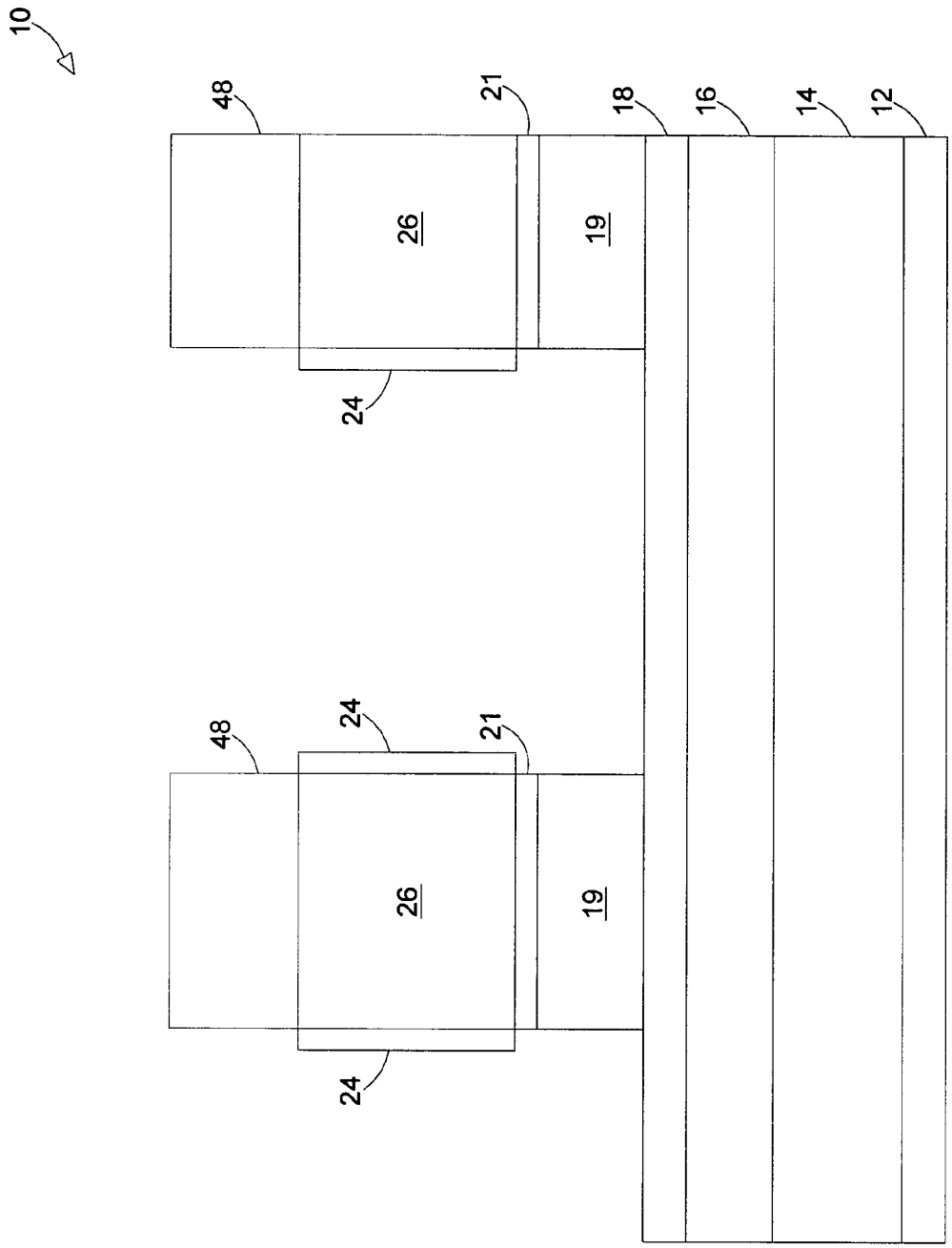
Figure 7:
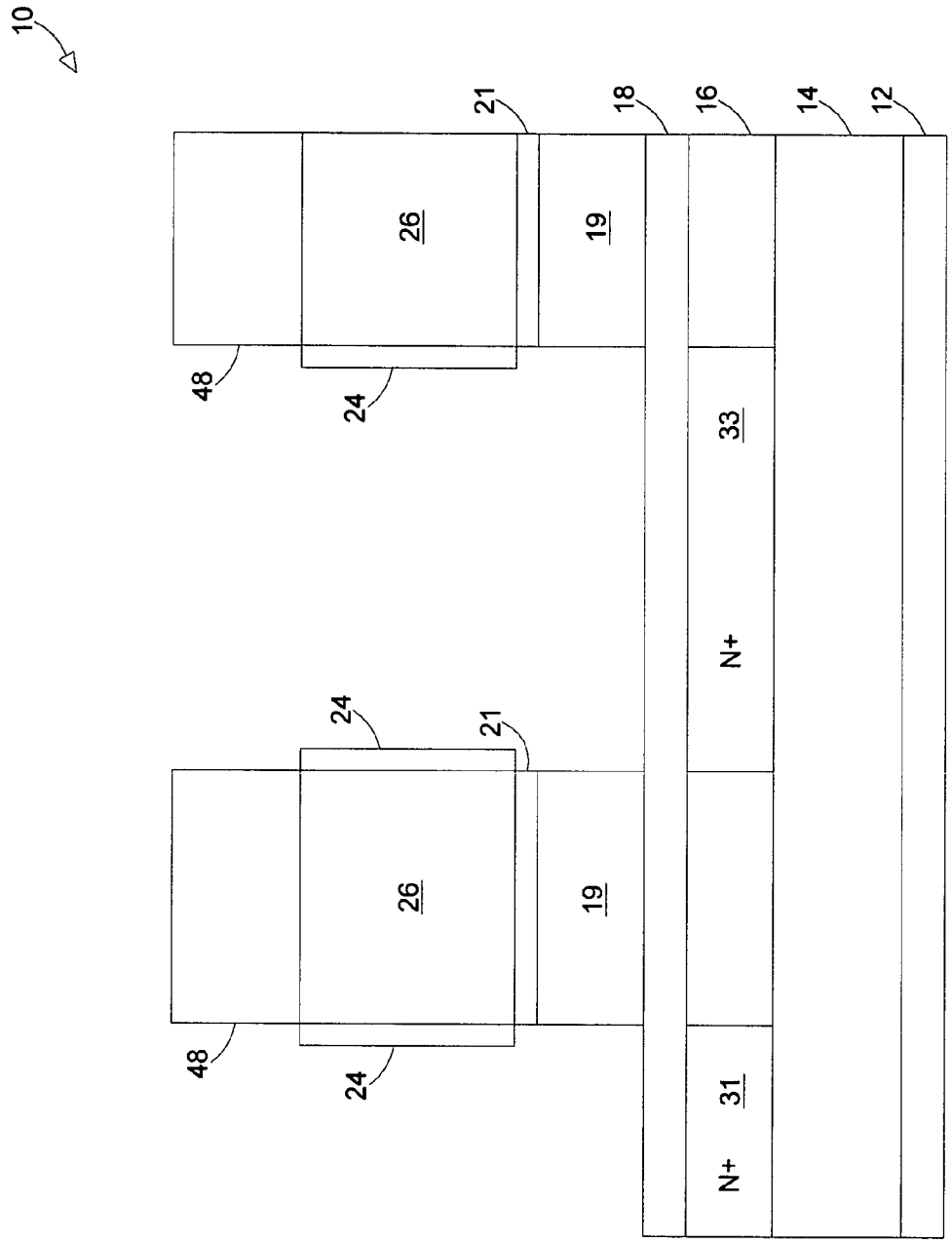
Figure 8:
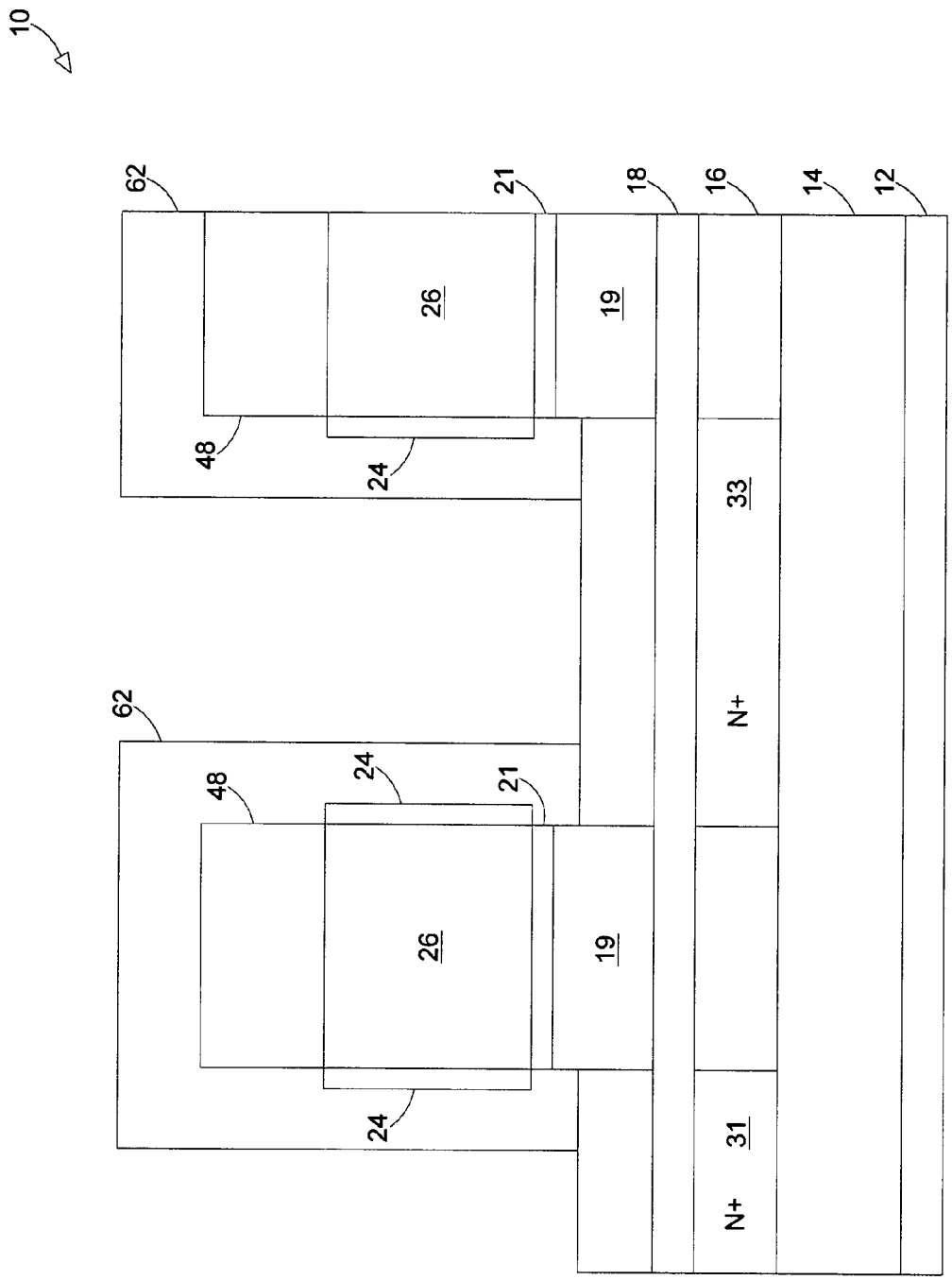
Figure 9:
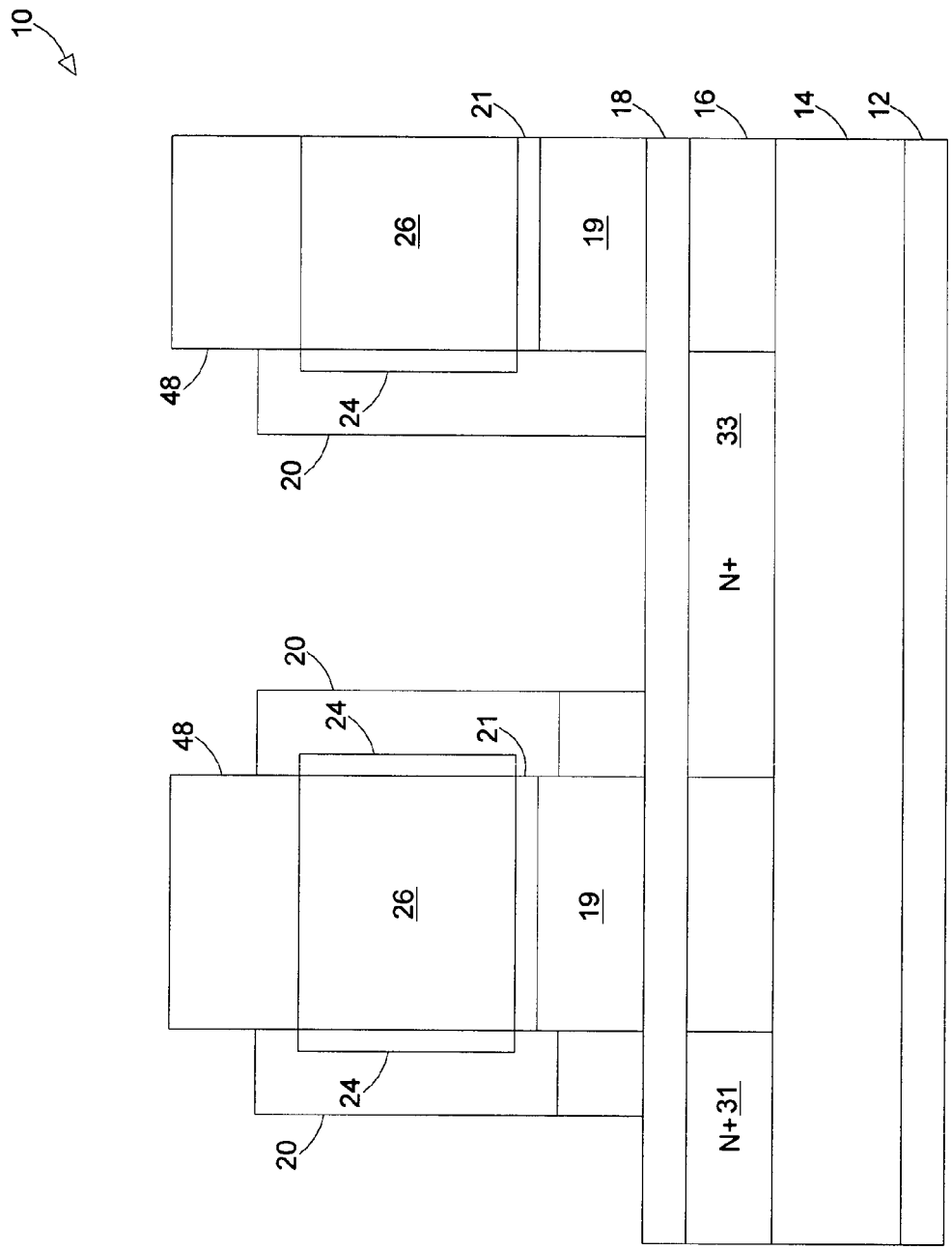
Figure 10:
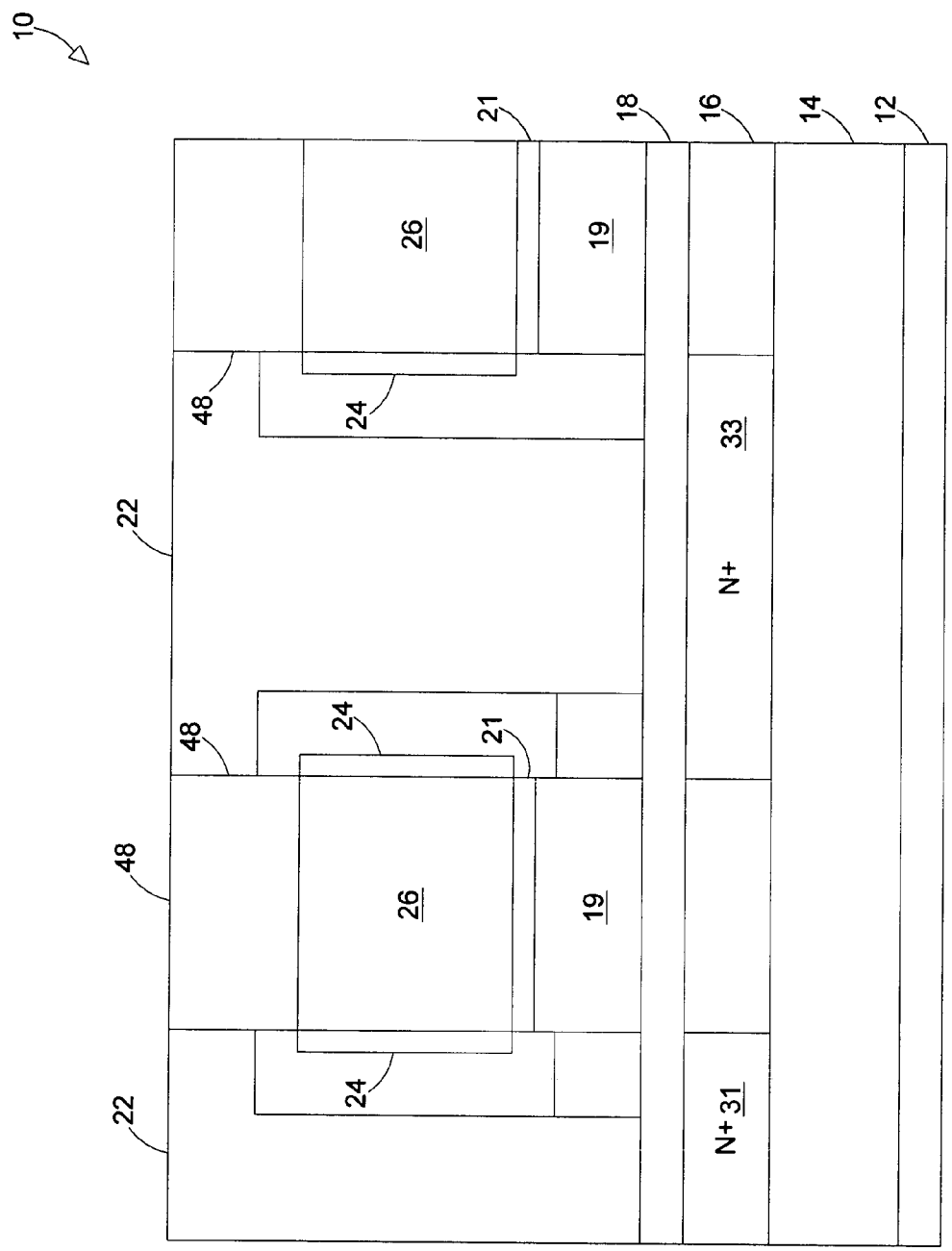
Figure 11:
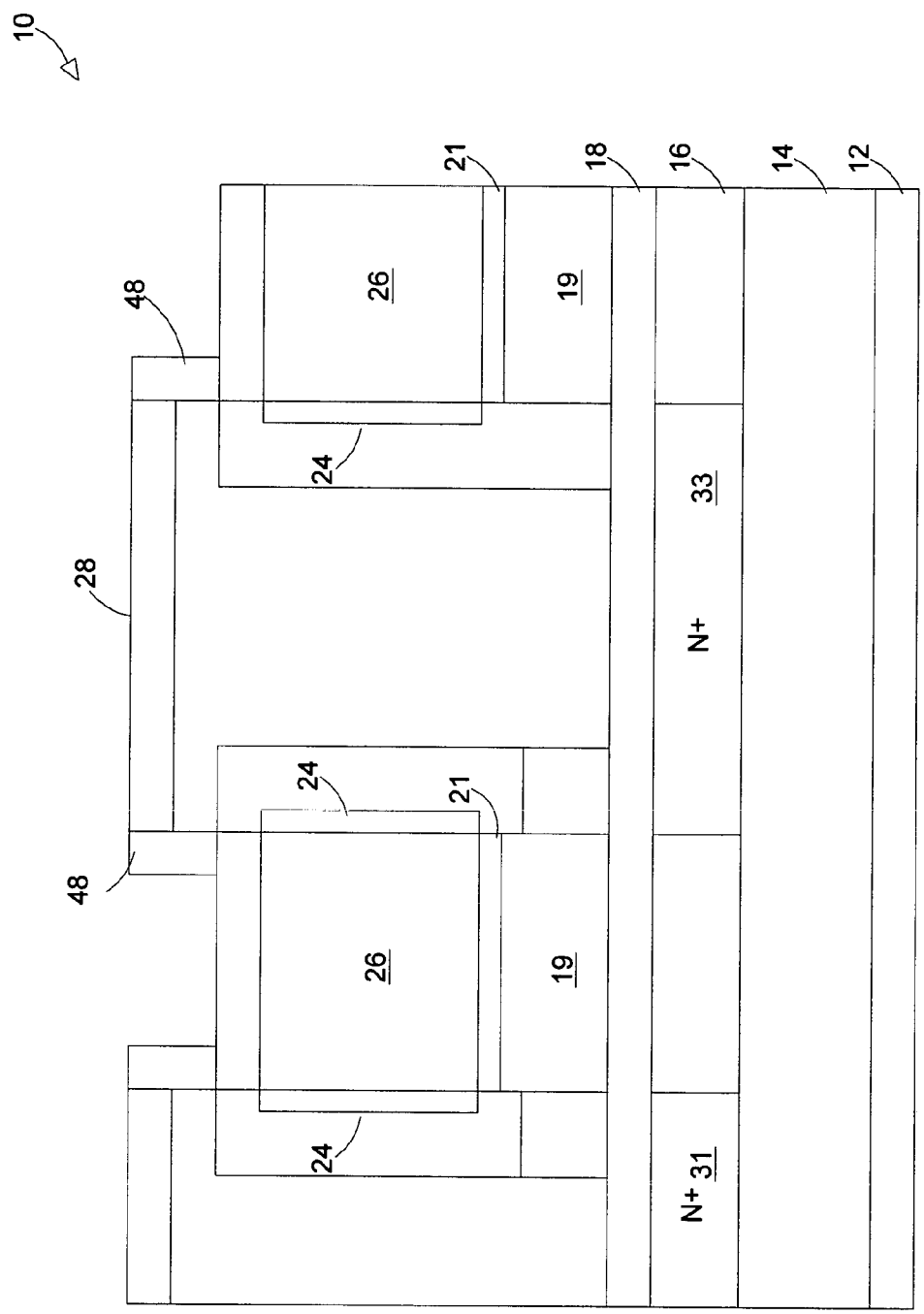
Figure 12:
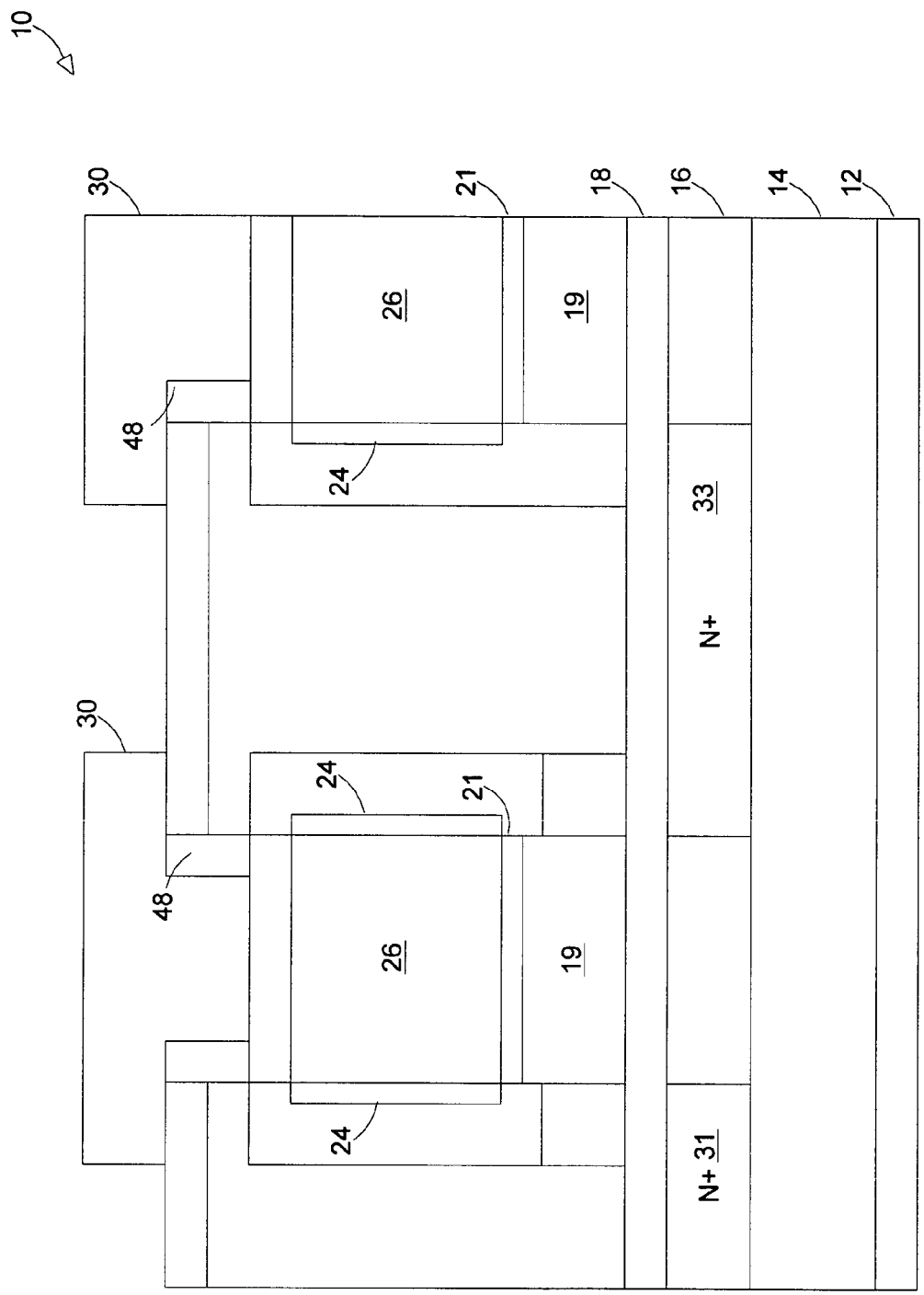

The CPU 418 operates as shown in the flow chart of FIG. 5. FIG. 5 is a flow chart of a method for operating the display apparatus, according to still another embodiment of the present invention. While not requested in all aspects, the method of FIG. 5 can be implemented as computer software usable by the CPU 418.

Referring to FIG. 5, if a user requests to control the storage medium 442 in operation 501, the CPU 418 forms a virtual file system for the storage medium 442 in operation 502. The CPU 418 downloads a file system stored on the storage medium 442 using the USB controller 419 and forms the virtual file system using the downloaded file system. However, it is understood that such a virtual file system can also be stored in the display 410, and that the file system can be obtained otherwise than from the storage medium 442.

Then, the CPU 418 generates management information for the storage medium 442 using the virtual file system in operation 503. The management information includes time information corresponding to the storage capacity of the storage medium 442, and list information of a video signal and/or an audio signal stored on the storage medium 442. The management information can be output as OSD information or as an audio signal.

For allowing the user to control the storage medium 442, information that can be requested or input by the user can also be output as OSD information or as an audio signal. Also, if a plurality of video signals and audio signals are stored on the storage medium 442, the list information includes index information for the plurality of video signals and audio signals. Accordingly, the user can select and reproduce a desired video signal and audio signal based on the list information. It is further understood that the information may include search results related to input received from a user.

If the user requests storage of the received video signal and/or audio signal in operation 504, the CPU 418 controls the display apparatus 410 so that a video signal and/or audio signal output from the video and audio signal receiving processor 411 is transmitted to the storage and reproduction unit 440 through the USB controller 419 (operation 505). The storage and reproduction unit 440 stores the video and/or audio signal received through the USB terminal 441 in the storage medium 442. When the video signal and/or audio signal are stored on the storage medium 442, the stored video signal and/or audio signal can be output to the display unit 413 and/or the speaker 415.

If storage termination is requested in operation 506, the CPU 418 terminates the storage operation. However, if the storage termination is not requested in operation 506, the CPU 418 returns to operation 505 and continuously transmits the received video signal and/or audio signal to the storage and reproduction unit until a signal requiring the storage termination is received.

If storage is not requested in operation 504 and the user requests reproduction of a video signal and/or audio signal stored on the storage medium 443 in operation 507, the CPU 418 reads the video signal and/or audio signal from the storage medium 442 of the storage and reproduction unit 440 using the USB controller 419 in operation 508. If a plurality of video signals and/or audio signals are stored on the storage medium 442, the read video signal and/or audio signal may be one video signal and/or audio signal among the plurality of video signals and/or audio signals.

The CPU 418 controls the display apparatus 410 so that the read video signal and/or audio signal is transmitted to the video signal processor 412 and the audio signal processor 414, respectively (operation 509). Accordingly, the display unit 413 and the speaker 415 output a reproduced video signal and audio signal, respectively. The reproduced video signal can be displayed together, such as in a PIP or PBP format, with the video signal received through the video and audio signal receiving processor 411.

If the user requests the reproduction termination in operation 510, the CPU 418 terminates the reproduction operation. However if the user does not request the reproduction termination, the CPU 418 returns to operation 508 and continuously performs the reproduction operation until a signal requesting the reproduction termination is received.

It is understood that the storage and reproduction unit 440 of FIG. 4 may be a memory card without a CPU. However, the unit 440 can also include a CPU which is not used during the recording and/or reproduction. If the storage and reproduction unit 440 receives a video and/or audio signal through the USB terminal 441, the storage and reproduction unit 440 stores the received video signal and/or audio signal in the storage medium 442. Also, the storage and reproduction unit 440 outputs a video signal and/or audio signal stored on the storage medium 442 through the USB terminal 441. Such storage and reproduction through the storage medium 442 are controlled by the CPU 418 using the virtual file system formed in the CPU 418.

As described above, according to an aspect of the present invention, it is possible to store a received video and audio signal in a storage medium included in a PC or other electronic device, and to reproduce a signal therefrom, by operating only a display apparatus without controlling the PC connected to the display apparatus. Therefore, a user does not need to operate the PC individually, in order to store and reproduce the video and audio signal received through the display apparatus. Also, according to an aspect of the invention, the user does not need to download related programs to the PC or mount a board such as a television integration board separately in the PC, for signal storage and reproduction. Additionally, according to an aspect of the invention, a storage and reproduction unit that includes a USB terminal without a PC can store and reproduce a video and/or audio signal received through a display apparatus. Further, according to an aspect of the invention, it is possible to improve a storage capacity of a storage medium by compressing a received video and audio signal in a display apparatus and transmitting the result to the external storage medium. Moreover, according to an aspect of the invention, it is possible to provide various storage and reproduction environments to users since a user can select a display format of a video signal to be stored or reproduced.

While not required in all aspects, it is understood that the controller can be computer implementing the method using the computer program encoded on a computer readable medium. The computer can be implemented as a chip having firmware, or can be a general or special purpose computer programmable to perform the method. Additionally, while described in terms of a display apparatus, it is understood that the invention can be used with an apparatus that reproduces other received signals without displaying video signals, such as audio receivers, or an apparatus that receives audio data and other data (such as image data and/or text information) to be displayed. It is further understood that the signal can be reproduced from the external storage medium while recording the received signal on the external storage medium.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A display apparatus enclosure configured to be capable of being connected to a removable external storage device, disposed external to the display apparatus through a port of the display apparatus, the display apparatus comprising:
   a receiving processor that receives a television broadcast signal and at least one of a digital video signal and an audio signal from the external storage device;
   a controller that, if a user commands storage of the received the television broadcast signal, stores the received television broadcast signal in the external storage device;
   a display unit to display the received digital video signal; and
   a speaker to output the received audio signal;
   wherein the controller forms a virtual file system for the display apparatus to control the external storage device by the controller downloading a file system of the external storage device from the external storage device to the display apparatus, such that the virtual file system for the display apparatus is configurable to be an abstraction of one or more physical file systems.

2. The display apparatus of claim 1, wherein the controller, according to a request from the user and when the received digital video signal and audio signal are stored in the external storage device, determines whether the received digital video signal and audio signal is to be output through the port.

3. The display apparatus of claim 1, wherein if an input of the user requests control of the external storage device, the controller outputs management information through the port, and uses the management information to manage the storage or reproduction of the received digital video signal and audio signal with respect to the external storage device.

4. The display apparatus of claim 3, wherein the management information for the video signal and audio signal stored in the external storage device is displayed in an on-screen display format on the display unit.

5. The display apparatus of claim 3, wherein the management information for the video signal and audio signal stored in the external storage device is output as an audio signal through the speaker.

6. The display apparatus of claim 3, wherein the management information comprises time information corresponding to a storage capacity of the external storage device, and a list including the stored digital video signal and audio signal and additional video signals and audio signals stored in the external storage device.

7. The display apparatus of claim 3, wherein the reproduced video signal and the audio signal are a video signal and an audio signal selected from a plurality of reproducible video signals and audio signals stored in the external storage device and which is selected by a user with reference to the management information.

8. A display apparatus configured to be capable of being connected to a removable external storage device, disposed external to the display apparatus through a port of the display apparatus, the display apparatus comprising:
   a receiving processor to receive at least one of a digital video signal and an audio signal;
   a display unit to display the received digital video signal;
   a speaker to output the received audio signal;
   a controller that forms a virtual file system for the display apparatus to control the external storage device based on a downloaded file system of the external storage device from the external storage device to the display apparatus, such that the virtual file system for the display apparatus is configurable to be an abstraction of one or more physical file systems, wherein,
   if a user requests storage of the received digital video signal and audio signal, the controller stores the received digital video signal and audio signal in the external storage device in real time with reference to information generated on the basis of the formed virtual file system, and
   if the user requests reproduction of the digital video signal and audio signal stored in the external storage device, the controller reproduces the stored video signal and an audio signal from the external storage device with reference to the information generated on the basis of the virtual file system; and
   an output unit, to output the reproduced video signal and audio signal respectively through the display unit and the speaker,
   wherein the controller is connected to the external storage device through the port.

9. The display apparatus of claim 8, wherein the controller controls the storage or the reproduction to output the digital video signal and audio signal received through the receiving processor to the output unit in real time.

10. The display apparatus of claim 8, wherein the information generated on the basis of the virtual file system comprises management information to control the external storage device.

11. The display apparatus of claim 10, wherein the management information comprises a storage capacity of the external storage device.

12. The display apparatus of claim 11, wherein the controller generates the management information so that the management information is output in an on-screen display format through the output unit.

13. The display apparatus of claim 8, wherein, when the video signal and/or the audio signal are reproduced from the external storage device, the controller displays the video signal reproduced from the external storage device and the received video signal together using the output unit in a Picture-In-Picture format or in a Picture-By-Picture format.

14. A display apparatus configured to be capable of being connected with a removable external storage device, disposed external to the display apparatus through a port of the display apparatus, the display apparatus comprising:
   a receiving processor that receives a digital video signal and an audio signal;
   a compression and decompression unit that
   if a user requests storing of the received digital video signal and audio signal, is set to a compression mode, and compresses the digital video signal and the audio signal received from the receiving processor, and
   an output unit to output the reproduced digital video signal and audio signal; and
   a controller that
   if the user requests the storage, controls the compression and decompression unit in the compression mode and stores the digital video signal and audio signal compressed by the compression and decompression unit in the external storage device in real time, and
   if the user requests the reproduction, outputs the digital video signal and audio signal from the external storage device to the output unit through the compression and decompression unit,
   wherein the output unit comprises a display unit to display the reproduced digital video signal and a speaker to output the reproduced audio signal and the controller forms a virtual file system for the display apparatus to control the external storage device by downloading a file system of the external storage device from the external storage device to the display apparatus, such that the virtual file system for the display apparatus is configurable to be an abstraction of one or more physical file systems.

15. The display apparatus of claim 14, wherein the controller controls the storage or reproduction of the digital video and audio signals with respect to the external storage device using the virtual file system.

16. The display apparatus of claim 15, wherein the controller forms the virtual file system if an input of the user requests control of the external storage device.

17. The display apparatus of claim 14, wherein the controller generates management information for managing the stored video signal and the audio signal in the external storage device using the virtual file system, and outputs the management information to the output unit.

18. The display apparatus of claim 17, wherein the controller generates the management information so that the management information is displayed in an on-screen display format on the output unit.

19. The display apparatus of claim 17, wherein the management information comprises time information corresponding to a storage capacity of the external storage device, and a list including the stored digital video signal and audio signal and additional video and audio signals stored in the external storage device.

20. The display apparatus of claim 14, wherein, when the received video signal and audio signal are output through the output unit in real time, the controller controls the storage or reproduction of the received video signal and the audio signal with respect to the external storage device.

21. The display apparatus of claim 20, wherein, when the video signal and the audio signal are reproduced from the external storage device, the controller displays the video signal restored from the compression and decompression unit and the received video signal together on the output unit in a Picture-In-Picture format or in a Picture-By-Picture format.

22. A method of operating a display apparatus configured to be capable of being connected to a removable external storage device, disposed external to the display apparatus through a port of the display apparatus, the method comprising:
   forming a virtual file system for the display apparatus for controlling the external storage device based on a file system of the external storage device downloaded from the external storage device to the display apparatus, such that the virtual file system for the display apparatus is configurable to be an abstraction of one or more physical file systems;

generating management information for the external storage device using the virtual file system;

receiving at least one of a digital video signal and an audio signal;

providing the generated management information to the user before the user requests a storage or reproduction of the at least one of the received digital video signal and audio signal; and transmitting the at least one of the received digital video signal and audio signal to the external storage device, wherein the display apparatus includes a display unit to display the received digital video signal, and a speaker to output the received audio signal.

23. The method of claim 22, wherein the forming of the virtual file system is performed if an input of the user requests control of the external storage device by the display apparatus.

24. The method of claim 22, wherein the receiving and transmitting comprises receiving a user selection indicating that the user requests reproduction of one digital video signal and audio signal selected from among a plurality of reproducible video signals and audio signals stored in the external storage device with reference to the management information output in the on-screen display format.

25. The method of claim 22, further comprising outputting the received digital video signal and audio signal in real time through the display apparatus during the receiving of the at least one of the video and audio signals with respect to the external storage device.

26. The method of claim 22, wherein the providing of the generated management information comprises providing information required by the user for use by the user in controlling the external storage device.

27. A method of operating a display apparatus configured to be capable of being connected to a removable external storage device, disposed external to the display apparatus through a port of the display apparatus, the method comprising:

downloading a file system of the external storage from the external storage to the display apparatus;

forming a virtual file system for the display apparatus to control the external storage device based on the file system of the external storage device, such that the virtual file system for the display apparatus is configurable to be an abstraction of one or more physical file systems;

receiving at least one of a digital video signal and audio signal at the display apparatus;

compressing the at least one of the received video signal and/or the audio signal, if a user requests storage of the received digital video signal and/or the audio signal;

storing the compressed video signal and/or audio signal in the external storage device in real time with a displaying of the received digital video signal through a display unit and/or reproducing of the received audio signal through a speaker; and restoring the stored and compressed video and audio signal stored in the external storage device, when the user requests reproduction of the stored digital video signal and/or audio signal from the external storage device using the display apparatus; and wherein the display apparatus includes the display unit to display the stored digital video signal and the speaker to output the stored audio signal.

28. A method of operating a display apparatus configured to be capable of being connected to a removable external storage device, disposed external to the display apparatus through a port of the display apparatus, the method comprising:

downloading a file system of the external storage to display apparatus;

forming a virtual file system for the display apparatus to control the external storage device based on the file system of the external storage device, such that the virtual file system for the display apparatus is configurable to be an abstraction of one or more physical file systems;

receiving at least one of a digital video signal and audio signal at the display apparatus;

compressing the at least one of the received video signal and/or the audio signal, if a user requests storage of the received digital video signal and/or the audio signal;

storing the compressed video signal and/or audio signal in the external storage device in real time with a displaying of the received digital video signal through a display unit and/or reproducing of the received audio signal through a speaker;

restoring the stored and compressed video and audio signal stored in the external storage device, when the user requests reproduction of the stored digital video signal and/or audio signal from the external storage device using the display apparatus; and outputting management information of the external storage device generated on the basis of the virtual file system, before the compression or the restoration is performed, wherein the display apparatus includes the display unit to display the stored digital video signal and the speaker to output the stored audio signal.

29. The method of claim 28, wherein the storing or the restoring of the compressed video and audio signal comprises the user requiring the storage or the reproduction of the compressed video and audio signal with reference to the output management information.

30. The method of claim 28, wherein the forming of the virtual file system is performed if an input of the user requests control of the external storage device.

31. A reproducing apparatus with a memory, the apparatus comprising:

a receiving processor to receive a digital video signal;

a display unit to display the digital video signal;

a speaker to output the received audio signal; and a controller to form a virtual file system for the display apparatus to control the memory, based on a file system of the memory, such that the virtual file system for the display apparatus is configured to be an abstraction of one or more physical file systems for collectively controlling the one or more physical file systems, to selectively store the digital video signal received through the receiving processor in the memory, and to control the display unit to reproduce the received digital video signal, wherein the controller is connected to the memory through the port, wherein the controller further selectively retrieves the stored signal from the memory and controls the display unit to output the retrieved signal, wherein the controller selectively outputs one of the received signal through the display unit in real time with the selective storing and the retrieved signal through the display unit, and wherein the virtual file system is further configured to provide a single directory to reference diverse file system types so that respective files of the diverse file system types are accessed as being a consistent file system type.

32. A reproducing apparatus configured to be capable of being connected to an external storage device, disposed external to the reproducing apparatus through a port of the reproducing apparatus, the apparatus comprising:
a receiving processor to receive a digital video signal and a television broadcast signal;
a speaker to output the received audio signal;
a display unit to display the digital video signal and the television broadcast signal; and
a controller to control a downloading of a file system of the external storage device to the reproducing apparatus, to control a forming of a virtual file system for the reproducing apparatus to control the external storage device based on the downloaded file system, such that the virtual file system for the reproducing apparatus is configurable to be an abstraction of one or more physical file systems, to control a transmitting of the received digital video signal from receiving processor to the external storage device, to control a storing of the digital video signal received from the receiving processor in the external storage device, and to control the display unit to reproduce the received digital video signal,
wherein the controller is connected to the external storage device through the port, wherein the reproducing apparatus further comprises a housing which houses the receiving processor, the controller, and a Universal Serial Bus (USB) interface, wherein the received signal is transferred from the USB interface through the port to the external storage device for the storing, and
wherein the virtual file system is configurable to provide a single directory to reference diverse file system types so that respective files of the diverse file system types are accessed as being a consistent file system type.

33. The reproducing apparatus of claim 32, wherein the controller further controls the interface in order to transmit the received signal to be stored in the external storage device.

34. The reproducing apparatus of claim 32, wherein:
the external storage device includes another controller and memory, and
the controller sends instructions through the USB interface to instruct the other controller to store the received signal in the memory.

35. At least one non-transitory computer readable medium comprising computer readable code to control at least one processing device to implement the method of claim 22.

36. The display apparatus of claim 2, wherein the external storage device is incorporated in a Personal Digital Assistant (PDA).

37. The apparatus of claim 2, wherein the external storage device is incorporated in an MP3 player.

38. The display apparatus of claim 2, wherein the external storage device is incorporated in a digital video recorder.

39. The method of claim 22, wherein the digital video signal and the audio signal are received from an external audio/video (AV) device.

40. The method of claim 22, wherein the received digital video and the audio signal are stored directly to the external storage device upon receipt without decompression.

41. The method of claim 22, wherein the external storage device is incorporated in an PDA.

42. The method of claim 22, wherein the external storage device is incorporated in an MP3 player.

43. The method of claim 22, wherein the external storage device is incorporated in a digital video recorder.

44. The method of claim 22, wherein the port is a Universal Serial Bus (USB) port.

45. The method of claim 22, further comprising:
reproducing the stored digital video signal and audio signal in response to a user command.

46. The method of claim 45, further comprising:
displaying the received digital video signal on the display unit; and
outputting the received digital video signal through the speaker.

47. A display apparatus configured to be capable of being connected to a removable external storage device, disposed external to the display apparatus through a Universal Serial Bus (USB) port of the display apparatus, the display apparatus comprising:
a receiving processor to receive the television broadcast signal;
a speaker to output an audio signal from the received television broadcast signal;
a display unit to display a video signal from the received television broadcast signal;
a USB controller connected to the USB port;
a video signal processor to selectively process one of a video signal from the received television broadcast signal and a video signal retrieved by the display apparatus from the external storage device, to output to the display unit;
an audio signal processor to selectively process one of an audio signal included in the received television broadcast signal and a audio signal retrieved by the display apparatus from the external storage device, and to output to the speaker;
an information receiver for receiving a request from a user;
an On Screen Display (OSD) information generator to generate an OSD information for controlling the external storage device; and
a controller to form a virtual file system of the display apparatus to control the external device based on a file system of the external storage device downloaded from the external storage device to the display apparatus, such that the virtual file system for the display apparatus is configurable to be an abstraction of one or more physical file systems, control the OSD information generator to display the generated OSD information on the display unit when the user request is received by the information receiver, and control the video signal processor and the audio signal processor to selectively output at least one of the retrieved video signal and the retrieved audio signal from the external storage device when the external storage device is connected to the USB port and the user request is received by the information receiver.

48. The apparatus of claim 47, wherein the user input is received by the information receiver by a remote controller.

49. The apparatus of claim 47, wherein the user request is received by the information receiver through a user selection of a key.

50. The display apparatus of claim 1, wherein the virtual file system is configurable to provide a single directory to reference diverse file system types so that respective files of the diverse file system types are accessed as being a consistent file system type.

51. The display apparatus of claim 1, wherein the controller controls the digital video signal and audio signal received through the receiving processor to be stored, according to the virtual file system, to the external storage device in real time with a reproducing of the television broadcast signal by the display unit and speaker.

52. The display apparatus of claim 51, wherein the virtual file system is configurable to provide a single directory to reference diverse file system types so that respective files of the diverse file system types are accessed as being a consistent file system type.

53. The display apparatus of claim 51, wherein the controller controls the received, according to the virtual file system, at least one of the digital video signal and audio signal from the external storage device to be respectively reproduced by the display unit and speaker, in real time with a reproducing of the television broadcast signal by the display unit and/or speaker.

54. The display apparatus of claim 1, wherein the controller controls the received, according to the virtual file system, at least one of the digital video signal and audio signal from the external storage device to be respectively reproduced by the display unit and speaker, in real time with a reproducing of the television broadcast signal by the display unit and/or speaker.

55. The display apparatus of claim 54, wherein the virtual file system is configurable to provide a single directory to reference diverse file system types so that respective files of the diverse file system types are accessed as being a consistent file system type.

56. The display apparatus of claim 8, wherein the virtual file system is configurable to provide a single directory to reference diverse file system types so that respective files of the diverse file system types are accessed as being a consistent file system type.

57. The display apparatus of claim 14, wherein the virtual file system is configurable to provide a single directory to reference diverse file system types so that respective files of the diverse file system types are accessed as being a consistent file system type.

58. The display method of claim 22, wherein the virtual file system is configurable to provide a single directory to reference diverse file system types so that respective files of the diverse file system types are accessed as being a consistent file system type.

59. The display method of claim 27, wherein the virtual file system is configurable to provide a single directory to reference diverse file system types so that respective files of the diverse file system types are accessed as being a consistent file system type.

60. The reproducing apparatus of claim 31, wherein the memory includes a removable memory card.

61. The reproducing apparatus of claim 31, wherein the memory includes a removable Universal Serial Bus (USB) memory device.

62. The reproducing apparatus of claim 31, wherein the controller controls the digital video signal and audio signal received through the receiving processor to be stored, according to the virtual file system, to the external storage device in real time with a reproducing of a television broadcast signal by the display unit and speaker.

63. The reproducing apparatus of claim 62, wherein the controller controls the received, according to the virtual file system, at least one of the digital video signal and audio signal from the external storage device to be respectively reproduced by the display unit and speaker, in real time with a reproducing of the television broadcast signal by the display unit and/or speaker.

64. The reproducing apparatus of claim 31, wherein the controller controls the received, according to the virtual file system, at least one of the digital video signal and audio signal from the external storage device to be respectively reproduced by the display unit and speaker, in real time with a reproducing of a television broadcast signal by the display unit and/or speaker.

65. The display apparatus of claim 47, wherein the virtual file system is configurable to provide a single directory to reference diverse file system types so that respective files of the diverse file system types are accessed as being a consistent file system type.

66. A method of operating a display apparatus configured to be capable of being connected to a removable external storage device, disposed external to an enclosure of the display apparatus through a port of the display apparatus, the method comprising:
  receiving a television broadcast signal and at least one of a digital video signal and an audio signal from the external storage device;
  forming a virtual file system for the display apparatus to control the external storage device by downloading a file system of the external storage device from the external device to the display apparatus, such that the virtual file system for the display apparatus is configurable to be an abstraction of one or more physical file systems;
  storing the received television broadcast signal in the external storage device, according to the virtual file system for the display apparatus, when a user commands storage of the received the television broadcast signal; and
  reproducing the received at least one of the digital video and audio signal respectively through a display unit and speaker of the display apparatus.

67. The method of claim 66, wherein the virtual file system is configurable to provide a single directory to reference diverse file system types so that respective files of the diverse file system types are accessed as being a consistent file system type.

68. The method of claim 66, further comprising storing the digital video signal and audio signal received through the receiving processor to be stored, according to the virtual file system, to the external storage device in real time with a reproducing of the television broadcast signal by the display unit and speaker.

69. The method of claim 68, wherein the virtual file system is configurable to provide a single directory to reference diverse file system types so that respective files of the diverse file system types are accessed as being a consistent file system type.

70. The method of claim 68, further comprising, according to the virtual file system, controlling the received at least one of the digital video signal and audio signal from the external storage device to be respectively reproduced by the display unit and speaker, in real time with a reproducing of the television broadcast signal by the display unit and/or speaker.

71. The method of claim 66, further comprising controlling, according to the virtual file system, the received at least one of the digital video signal and audio signal from the external storage device to be respectively reproduced by the display unit and speaker, in real time with a reproducing of the television broadcast signal by the display unit and/or speaker.

72. The method of claim 71, wherein the virtual file system is configurable to provide a single directory to reference diverse file system types so that respective files of the diverse file system types are accessed as being a consistent file system type.

73. The method of claim 66, further comprising, according to a request from the user and when the received digital video signal and audio signal are stored in the external storage device, determining whether the received digital video signal and audio signal is to be output through the port.

74. The method of claim 66, further comprising outputting, when an input of the user requests control of the external storage device, management information through the port, and managing the storage or reproduction of the received digital video signal and audio signal with respect to the external storage device based on the management information.

75. The method of claim 74, further comprising displaying the management information for the video signal and audio signal stored in the external storage device in an on-screen display format on the display unit.

76. The method of claim 74, further comprising outputting the management information for the video signal and audio signal stored in the external storage device as an audio signal through the speaker.

77. The method of claim 74, wherein the management information comprises time information corresponding to a storage capacity of the external storage device and a list including the stored digital video signal and audio signal and additional video signals and audio signals stored in the external storage device.

78. The method of claim 74, wherein the reproduced video signal and the audio signal are a video signal and an audio signal, selected from a plurality of reproducible video signals and audio signals stored in the external storage device, determined to have been selected by a user with reference to the management information.

79. The reproducing apparatus of claim 31, wherein the controller downloads the file system from the external storage to the display unit.

80. The reproducing apparatus of claim 32, wherein the controller downloads the file system from the external storage to the display unit.

81. The method of claim 27, further comprising:
outputting management information of the external storage device generated on the basis of the virtual file system, before the compression or the restoration is performed.

82. The method of claim 81, wherein the storing or the restoring of the compressed video and audio signal comprises the user requiring the storage or the reproduction of the compressed video and audio signal with reference to the output management information.

83. The method of claim 81, wherein the forming of the virtual file system is performed if an input of the user requests control of the external storage device.

\* \* \* \* \*